United States Patent
Kaneko et al.

(10) Patent No.: US 12,187,117 B2
(45) Date of Patent: Jan. 7, 2025

(54) LID OPENING/CLOSING DEVICE

(71) Applicant: TOYODA GOSEI CO., LTD., Kiyosu (JP)

(72) Inventors: Kenichiro Kaneko, Kiyosu (JP); Kohei Shirota, Kiyosu (JP); Yuki Terazawa, Kiyosu (JP); Kazuki Fujisawa, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/495,404

(22) Filed: Oct. 26, 2023

(65) Prior Publication Data
US 2024/0157783 A1    May 16, 2024

(30) Foreign Application Priority Data
Nov. 11, 2022 (JP) ................. 2022-181455

(51) Int. Cl.
*B60K 15/05* (2006.01)

(52) U.S. Cl.
CPC ...... *B60K 15/05* (2013.01); *B60K 2015/0523* (2013.01)

(58) Field of Classification Search
CPC ................. B60K 15/05; B60K 2015/0523
See application file for complete search history.

(56) References Cited

U.S. PATENT DOCUMENTS

| | | | |
|---|---|---|---|
| 2015/0375630 A1 | 12/2015 | Jeong et al. | |
| 2022/0134874 A1* | 5/2022 | Tanaka | B60K 15/05 |
| | | | 296/97.22 |

FOREIGN PATENT DOCUMENTS

DE        10341921 A1 *   4/2005   ............. B60K 15/05

* cited by examiner

*Primary Examiner* — Mahmoud Gimie
(74) *Attorney, Agent, or Firm* — Posz Law Group, PLC

(57) ABSTRACT

A lid opening/closing device includes a lid box, a lid, and an opening/closing mechanism. The opening/closing mechanism includes, as a link interposed between the lid box and the lid, a main arm rotatably supported on the lid box at one main arm end portion thereof and an auxiliary arm configured to restrict a posture of the lid during opening/closing of the lid so as to keep the lid in a predetermined posture by rotating in conjunction with rotation of the main arm. The main arm includes an arm-side restriction portion configured to come into contact with a back surface side of the lid at an opened position of the lid to restrict the main arm from rotating to an open side. An axial length of the arm-side restriction portion is longer than an axial length of the one main arm end portion.

4 Claims, 5 Drawing Sheets

LID OPENING/CLOSING DEVICE

TECHNICAL FIELD

The present invention relates to a lid opening/closing device capable of opening/closing a lid for opening/closing an opening of a lid box.

BACKGROUND ART

Hitherto, a lid opening/closing device that is mounted on, for example, a vehicle and opens/closes an opening of a lid box by using a lid has been known (e.g., US Patent Application Publication No. 2015/0375630). The lid box is a base member that is mounted on a vehicle body to expose a charge port, a fuel port, or the like of the vehicle. In addition, the lid is a lid member that is opened/closed between a closed position at which the lid member closes the opening of the lid box and an opened position at which the lid member opens the opening. The opening/closing motion of the lid is achieved by an opening/closing mechanism.

In the lid opening/closing device described in US Patent Application Publication No. 2015/0375630, the opening/closing mechanism includes a link interposed between the lid box and the lid. The link includes two arms extending parallel to each other between the lid box and the lid. Each arm is rotatably supported on the lid box, and is rotatably supported on the lid. One arm is rotated by applied power to transmit an opening/closing driving force to the lid. The other arm rotates in conjunction with the rotation of the one arm to restrict the posture of the lid during opening/closing of the lid such that the lid is kept parallel to the opening. Each of these arms has a bifurcated portion that is divided into two parts in the axial direction thereof from a plate surface portion at an arm center and extends in the arm longitudinal direction thereof, and is supported on the lid at each end portion of the bifurcated portion.

SUMMARY OF INVENTION

Technical Problem

Meanwhile, in order to stably position and fix the lid at the opened position of the lid, restricting the lid from being further opened from the opened position is important. As a method for restricting the lid, bringing an end portion on the lid side out of both end portions in the arm longitudinal direction of each arm of the opening/closing mechanism into contact with the back surface side of the lid when the lid reaches the opened position is conceivable.

However, in the structure in which the end portion in the arm longitudinal direction of each arm is divided into two parts as described above, the portion, of the arm, which comes into contact with the back surface side of the lid is limited to the end portion on the lid side of the bifurcated portion, and the region where the arm and the lid come into contact with each other at the lid opened position becomes narrower, so that the lid may be unstably positioned and fixed at the opened position thereof.

The present invention has been made in view of such circumstances, and an object of the present invention is to provide a lid opening/closing device capable of stably positioning and fixing a lid relative to a lid box at an opened position of the lid.

Solution to Problem

An aspect of the present invention is directed to a lid opening/closing device including: a lid box provided with an opening; a lid configured to be opened/closed between a closed position at which the lid closes the opening and an opened position at which the lid opens the opening; and an opening/closing mechanism configured to open/close the lid with respect to the lid box, wherein the opening/closing mechanism includes a link interposed between the lid box and the lid, the link includes a main arm rotatably supported on the lid box at one main arm end portion thereof, rotatably supported on the lid at another main arm end portion thereof, and configured to transmit an externally applied opening/closing driving force to the lid, and an auxiliary arm rotatably supported on the lid box at one auxiliary arm end portion thereof, rotatably supported on the lid at another auxiliary arm end portion thereof, and configured to restrict a posture of the lid during opening/closing of the lid so as to keep the lid in a predetermined posture, by rotating in conjunction with rotation of the main arm, the main arm includes an arm-side restriction portion provided to the other main arm end portion, extending in a direction parallel to a rotation axis on the other main arm end portion side, and configured to come into contact with a back surface side of the lid at the opened position of the lid to restrict the main arm from rotating to an open side, the lid includes a lid-side restriction portion provided on the back surface side thereof and configured to come into contact with the arm-side restriction portion at the opened position of the lid to restrict the main arm from rotating to the open side, and an axial length of the arm-side restriction portion is longer than an axial length of the one main arm end portion.

With this configuration, the lid is stably positioned and fixed relative to the lid box at the opened position thereof.

DESCRIPTION OF EMBODIMENTS

Hereinafter, a specific embodiment of the lid opening/closing device according to the present invention will be described with reference to FIG. 1 to FIG. 9.

A lid opening/closing device 1 according to the embodiment is a device for opening/closing a lid with respect to a lid box.

The lid opening/closing device 1 is mounted, for example, on a vehicle such as a gasoline vehicle, a diesel vehicle, an electric vehicle, and a hybrid vehicle, and is installed in a mounting hole 2a provided in a vehicle body surface 2 of a vehicle body side portion, a vehicle body front portion, or the like. For example, a supply port (specifically, a charge port, a fuel port, or the like: see FIG. 2) 3 for supplying energy to the vehicle is placed on a far side of the mounting hole 2a.

In the present embodiment, directions are indicated on the basis of the case where the lid opening/closing device 1 is viewed from the outside of the vehicle, as appropriate, a direction connecting the outer side (near side) of the vehicle and the inner side (far side) of the vehicle is referred to as inside-outside direction X, a horizontal direction along the vehicle body surface 2 is referred to as right-left direction Y, and a vertical direction along the vehicle body surface 2 is referred to as up-down direction Z.

Figure 1:
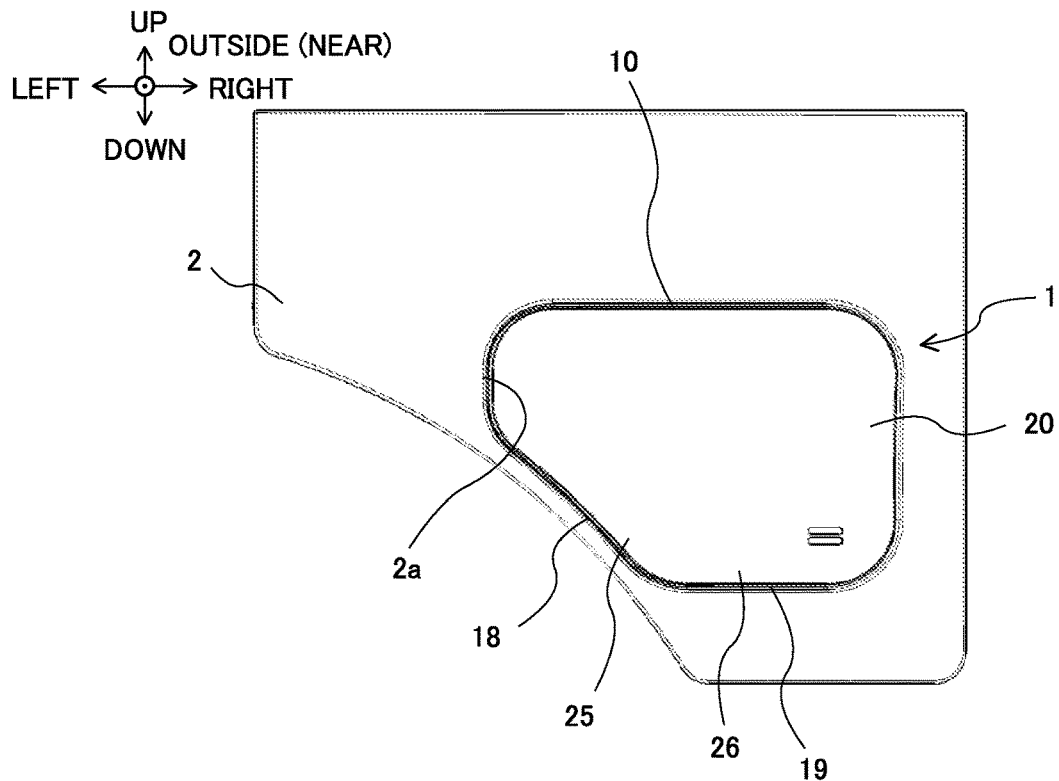
FIG. 1 is a front view of a lid opening/closing device mounted on a vehicle according to an embodiment of the present invention, at a lid closed position.
Figure 2:
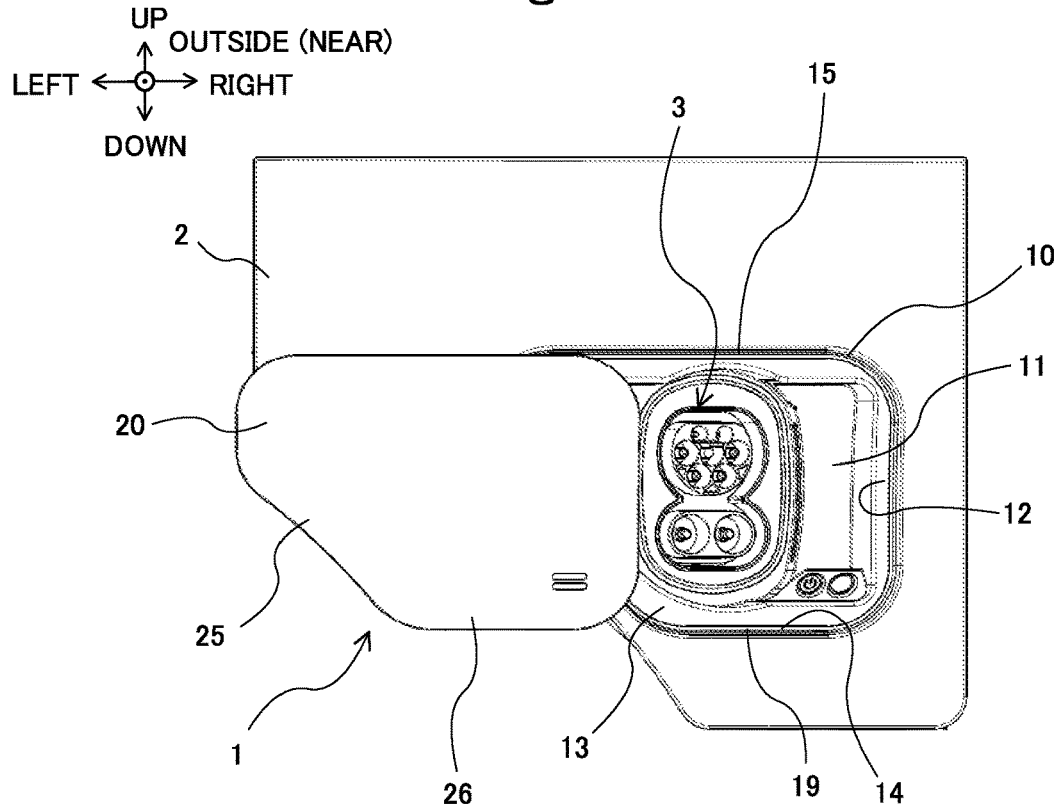
FIG. 2 is a front view of the lid opening/closing device of the embodiment at a lid opened position.

As shown in FIG. 1 and FIG. 2, the lid opening/closing device 1 includes a lid box 10, a lid 20, and an opening/closing mechanism 30. The lid opening/closing device 1 transmits power to the lid 20 by drive of the opening/closing mechanism 30, thereby opening/closing the lid 20 with respect to the lid box 10.

The lid box 10 is a container-like or box-like box member in which the supply port 3 is housed. The lid box 10 is mounted and fixed to the vehicle body surface 2 so as to be fitted into the mounting hole 2a. The lid box 10 includes a bottom wall portion 11, a side wall portion 12, a housing space 13, and an opening 14. The lid box 10 is a bottomed tubular member that is configured such that the bottom wall portion 11 is formed on a far side and the side wall portion 12 surrounds the bottom wall portion 11 to define the housing space 13 and in which the opening 14 is formed on a near side. The lid box 10 is an injection-molded article molded from a resin or the like.

The supply port 3 is provided at one end of a pipe or cable connected at another end thereof to a fuel tank, a battery, or the like. The fuel tank or the battery is placed on the far side with respect to a through hole 11a provided in the bottom wall portion 11. The supply port 3 is placed on the near side with respect to the through hole 11a and housed in the housing space 13. While the supply port 3 is hidden on the far side of the lid 20 at the closed position of the lid 20, the supply port 3 is exposed to the outside of the vehicle through the opening 14 at the opened position of the lid 20 so as to allow fuel supply and charging.

The lid box 10 includes a frame portion 15. The frame portion 15 is formed in an annular shape along a peripheral portion of the opening 14, and is formed in a flange shape so as to extend in a frame outward direction from the peripheral portion of the opening 14. The lid box 10 is positioned on the vehicle body surface 2 by bringing the back surface of the frame portion 15 into contact with a flange surface or the like at the periphery of the mounting hole 2a of the vehicle body surface 2.

Figure 5:
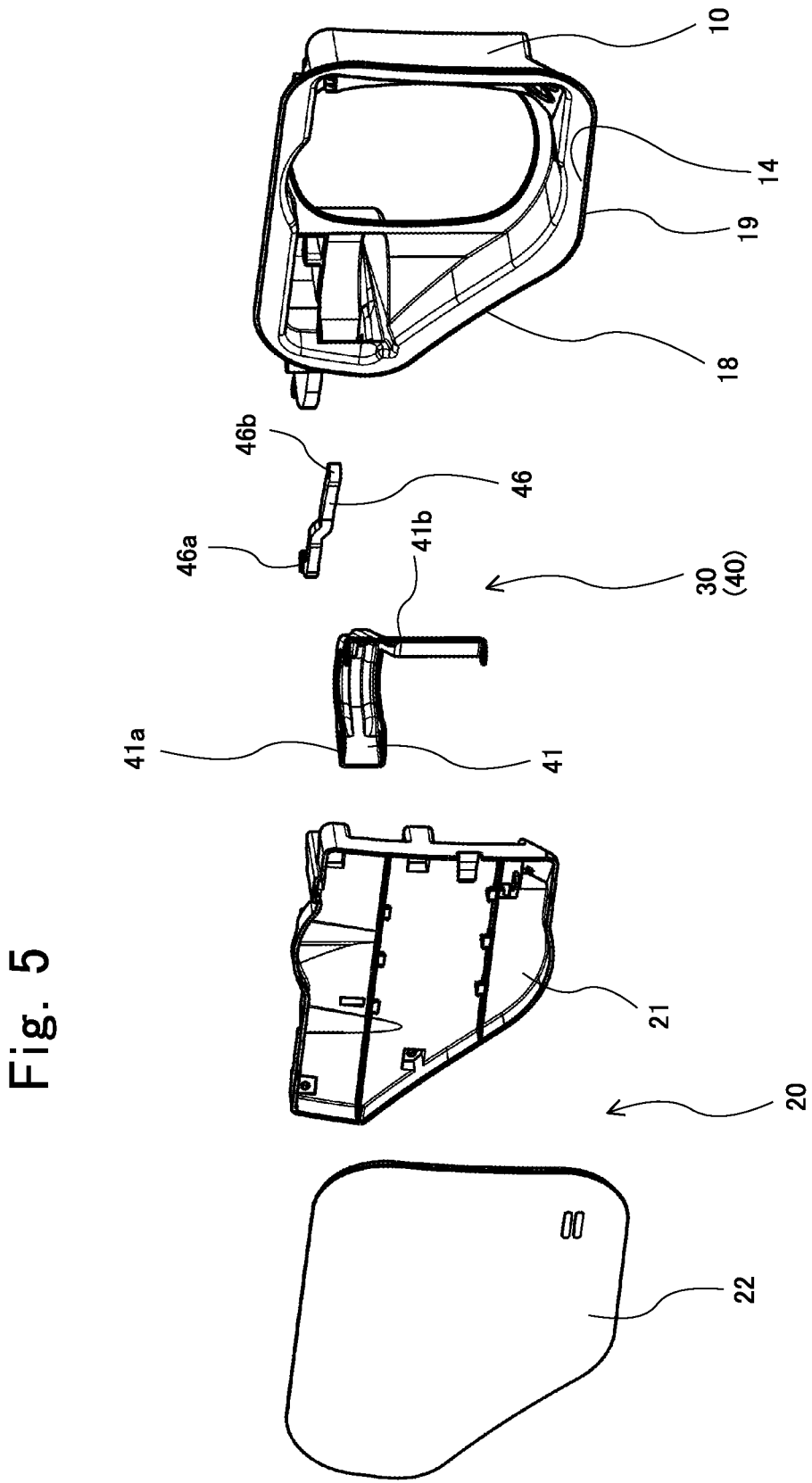
FIG. 5 is an exploded perspective view of the lid opening/closing device of the embodiment.

The lid 20 is a lid member for opening/closing the opening 14 of the lid box 10. The lid 20 is formed in a plate shape. The lid 20 is sized so as to match the opening 14 and the frame portion 15 at the periphery of the opening 14. The lid 20 closes the opening 14 at the closed position of the lid 20 such that the lid 20 is flush with the vehicle body surface 2. The surface of the lid 20 may be curved so as to match the vehicle body surface 2. The lid 20 is, for example, an injection-molded article molded from a resin. In addition, in the lid 20, as shown in FIG. 5, an inner member 21 on the inner side of the vehicle and an outer member 22 on the outer side of the vehicle may be assembled and integrated with each other.

The lid 20 is capable of being opened/closed so as to move between the closed position and the opened position. The closed position is a position at which the lid 20 closes the opening 14. In addition, the opened position is a predetermined position at which the lid 20 opens the opening 14. The lid 20 is supported so as to be movable in position relative to the lid box 10. The lid 20 is capable of being opened/closed by power from the opening/closing mechanism 30.

The opening/closing mechanism 30 is a mechanism that opens/closes the lid 20 with respect to the lid box 10 between the closed position and the opened position. The opening/closing mechanism 30 may be, for example, a mechanism that opens/closes the lid 20 by using power generated by an actuator such as a motor, or a mechanism that opens/closes the lid 20 by using an external force caused by a manual operation of an operator (e.g., an operation of pulling a wire) as power. Furthermore, the opening/closing mechanism 30 may be a mechanism that opens/closes the lid 20 by selectively using the power generated by the actuator and the external force caused by the manual operation.

Moreover, the opening/closing mechanism 30 may be a mechanism that uses different types of power sources as an opening power source for opening the lid 20 and a closing power source for closing the lid 20. For example, the power source for opening the lid 20 may be an actuator, and the power source for closing the lid 20 may be a manual operation of the operator. Moreover, the opening/closing mechanism 30 may be a mechanism that opens the lid 20 by using an actuator during normal operation but opens the lid 20 through a manual operation of the operator in an emergency such as a failure of the actuator.

Figure 3:
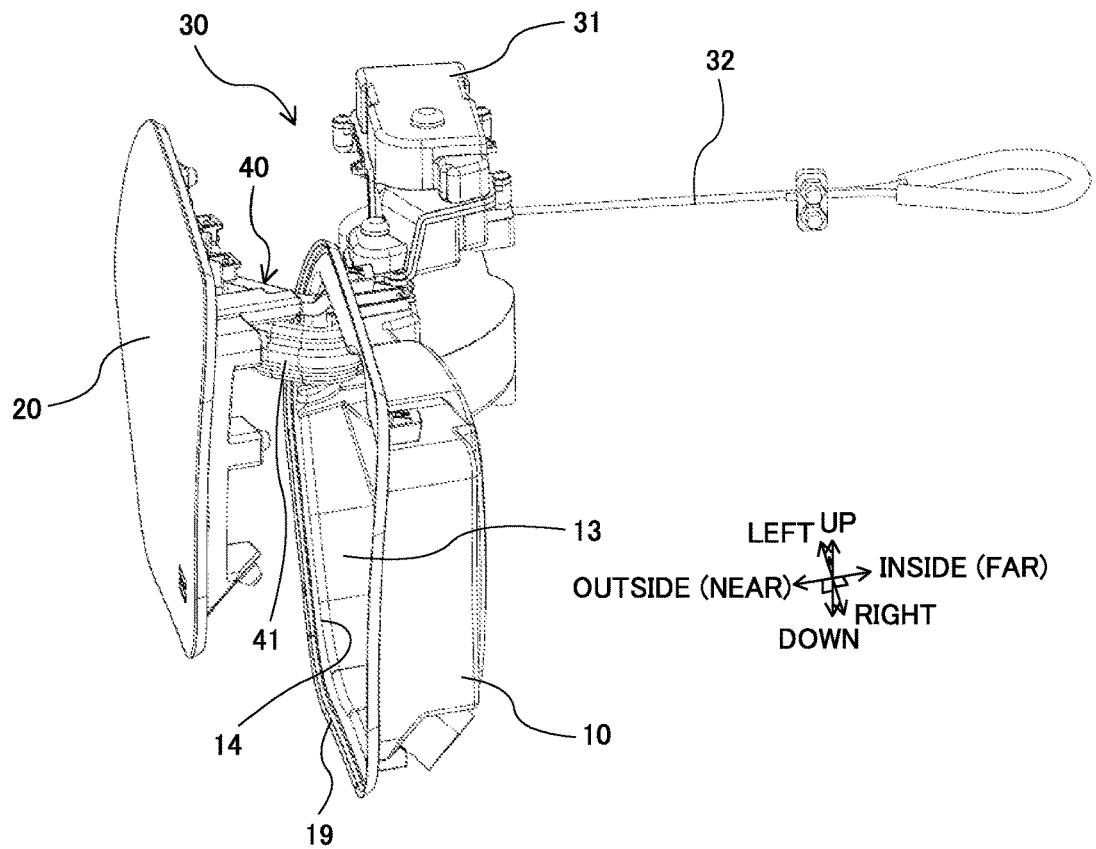
FIG. 3 is a perspective view of the lid opening/closing device of the embodiment from the front oblique upper side at the lid opened position.
Figure 4:
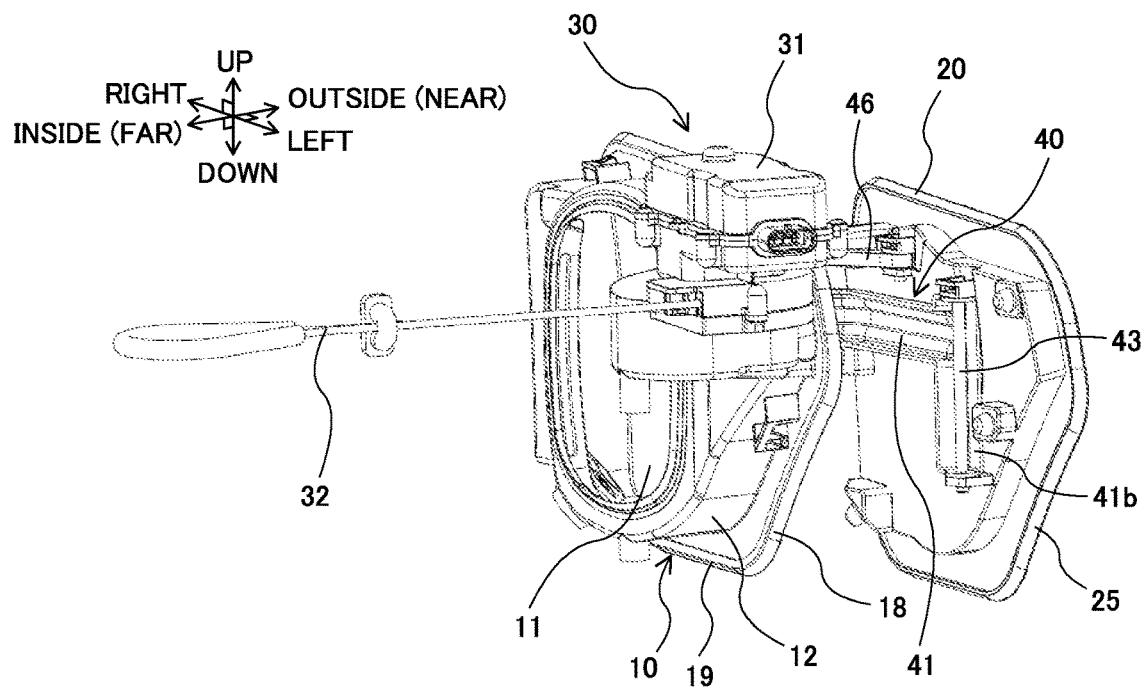
FIG. 4 is a perspective view of the lid opening/closing device of the embodiment from the back oblique upper side at the lid opened position.

In the present embodiment, as shown in FIG. 3 and FIG. 4, the opening/closing mechanism 30 includes an electric actuator 31 and an operation member 32. The electric actuator 31 is a device that generates an opening/closing driving force as power for opening/closing the lid 20 when electric power is supplied thereto. The operation member 32 is a member that converts an external force caused by a manual operation of the operator into power for opening the lid 20.

The electric actuator 31 generates an opening driving force for opening the lid 20 from the closed position to the opened position, when a predetermined opening switch is turned on. In addition, the electric actuator 31 generates a closing driving force for closing the lid 20 from the opened position to the closed position, when a predetermined closing switch is turned on. The operation member 32 is capable of opening the lid 20 by being manually operated in an emergency, for example, during a failure of the electric actuator 31. The power generated by the electric actuator 31 and the power converted by the operation member 32 are transmitted to the lid 20 via a link 40 described later.

The direction in which the opening/closing mechanism 30 opens/closes the lid 20 with respect to the lid box 10 may be the up-down direction Z or the right-left direction Y. In the present embodiment, the opening/closing mechanism 30 opens/closes the lid 20 in the right-left direction Y. In addition, the direction in which the lid 20 is moved relative to the lid box 10 in the vicinity of the closed position by the opening/closing mechanism 30 is preferably the inside-outside direction X in order to ensure the sealability of the housing space 13 at the closed position of the lid 20.

The opening/closing mechanism 30 is a sliding type mechanism that moves the lid 20 while maintaining a state where the lid 20 is parallel to the vehicle body surface 2 and the opening 14 when opening/closing the lid 20. The opening/closing mechanism 30 includes the link 40 interposed between the lid box 10 and the lid 20. The link 40 includes a main arm 41 and an auxiliary arm 46.

Figure 6:
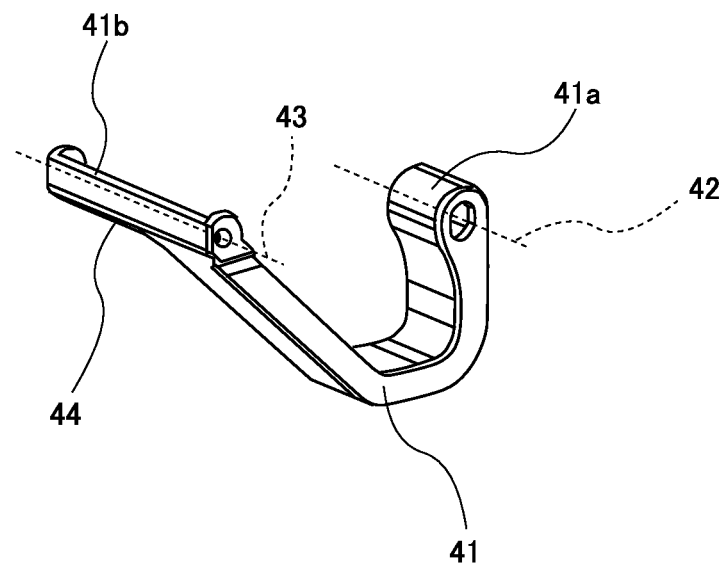
FIG. 6 is a perspective view of a main arm of a link of an opening/closing mechanism included in the lid opening/closing device of the embodiment.
Figure 7:
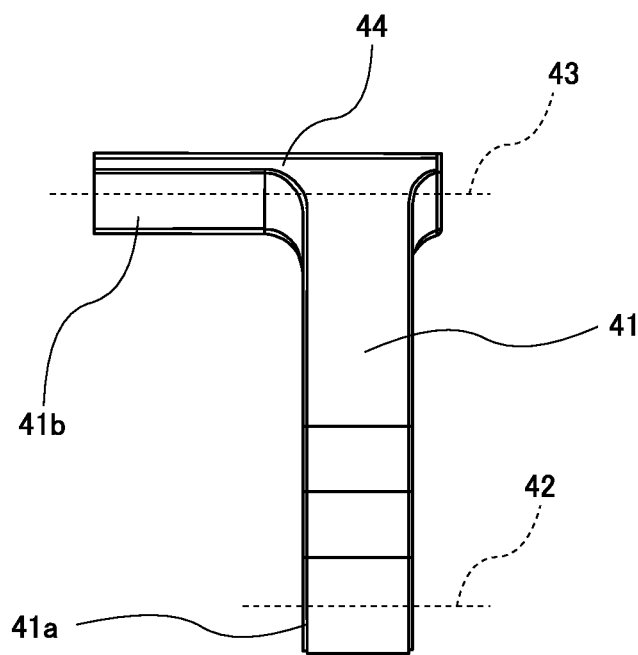
FIG. 7 is a front view of the main arm included in the lid opening/closing device of the embodiment.
Figure 8:
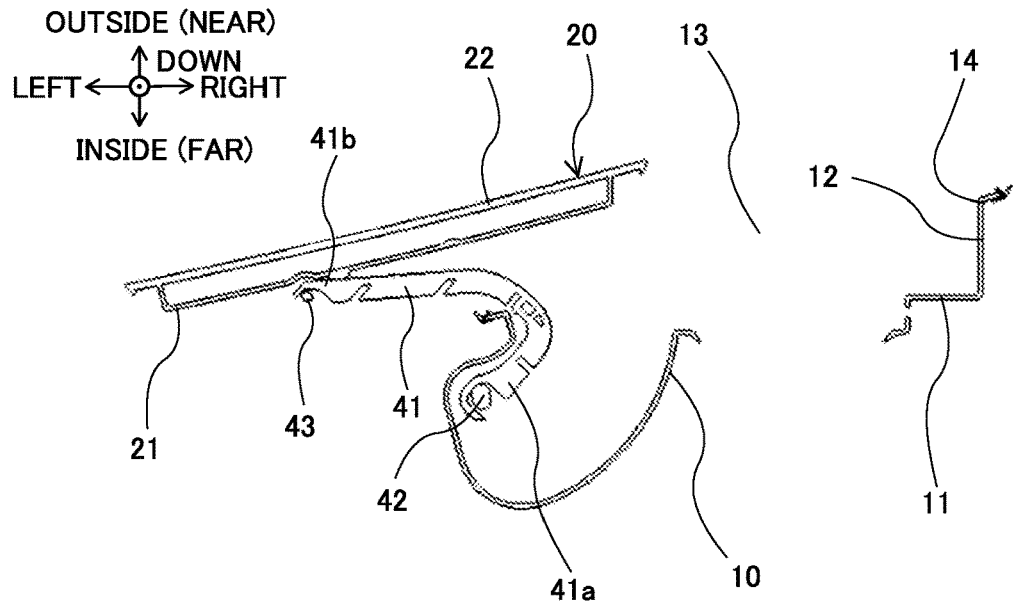
FIG. 8 is a cross-sectional view illustrating a positional relationship between a lid, a lid box, and the main arm at the lid opened position of the lid opening/closing device of the embodiment.

The main arm 41 is an arm member that transmits an opening/closing driving force applied as power from the electric actuator 31 or the operation member 32, to the lid 20. As shown in FIG. 6 and FIG. 7, the main arm 41 extends in an arm shape between the lid box 10 and the lid 20. The main arm 41 is formed in a T-shape. As shown in FIG. 5, the main arm 41 includes one main arm end portion 41a provided on the lid box 10 side in an arm longitudinal direction and another main arm end portion 41b provided on the lid 20 side in the arm longitudinal direction.

The main arm 41 is formed in a shape corresponding to a narrow portion 18 of the lid box 10 and a narrow portion 25 of the lid 20 described later. For example, in the case where the lid box 10 is placed close to the inclination of the vehicle body surface 2, that is, the narrow portions 18 and 25 are each a portion in which any one side of both end portions in the up-down direction Z of the lid box 10 is inclined, the main arm 41 is formed so as to be asymmetrical in a direction (direction extending horizontally in FIG. 7) orthogonal to the arm longitudinal direction (direction extending vertically in FIG. 7).

Specifically, a center line of the width of the one main arm end portion 41a in an orthogonal direction orthogonal to the arm longitudinal direction and a center line of the width of the other main arm end portion 41b in the orthogonal direction orthogonal to the arm longitudinal direction are displaced with respect to each other in the orthogonal direction. That is, the other main arm end portion 41b has different lengths by which the other main arm end portion 41b protrudes on both sides in the orthogonal direction orthogonal to the arm longitudinal direction with the center line of the width of the one main arm end portion 41a in the orthogonal direction therebetween. FIG. 7 shows the main arm 41 in which the length by which the other main arm end portion 41b protrudes leftward is longer than the length by which the other main arm end portion 41b protrudes rightward.

The main arm 41 is rotatably supported on the lid box 10 at the one main arm end portion 41a, and is rotatably supported on the lid 20 at the other main arm end portion 41b. The main arm 41 is rotated relative to the lid box 10 about a rotation axis (hereinafter, referred to as box-side main rotation axis) 42 provided on the one main arm end portion 41a side. In addition, the main arm 41 is rotated relative to the lid 20 about a rotation axis (hereinafter, referred to as lid-side main rotation axis) 43 provided on the other main arm end portion 41b side. The lid-side main rotation axis 43 extends parallel to the above box-side main rotation axis 42.

The auxiliary arm 46 is an arm member that restricts the posture of the lid 20 during opening/closing of the lid 20 so as to keep the lid 20 in a predetermined posture, that is, so as to maintain a state where the lid 20 is parallel to the opening 14, by rotating in conjunction with the rotation of the main arm 41. The auxiliary arm 46 extends in an arm shape between the lid box 10 and the lid 20. As shown in FIG. 5, the auxiliary arm 46 includes one auxiliary arm end portion 46a provided on the lid box 10 side in an arm longitudinal direction, and another auxiliary arm end portion 46b provided on the lid 20 side in the arm longitudinal direction.

The auxiliary arm 46 is rotatably supported on the lid box 10 at the one auxiliary arm end portion 46a, and is rotatably supported on the lid 20 at the other auxiliary arm end portion 46b. The auxiliary arm 46 is rotated relative to the lid box 10 about a box-side auxiliary rotation axis (not shown) provided on the one auxiliary arm end portion 46a side. The box-side auxiliary rotation axis extends parallel to the above box-side main rotation axis 42 at a position displaced in a radial direction from the box-side main rotation axis 42. In addition, the auxiliary arm 46 is rotated relative to the lid 20 about a lid-side auxiliary rotation axis (not shown) provided on the other auxiliary arm end portion 46b side. The lid-side auxiliary rotation axis extends parallel to the above lid-side main rotation axis 43 at a position displaced in the radial direction from the lid-side main rotation axis 43.

The other main arm end portion 41b of the main arm 41 is formed so as to include a shape extending in the axial direction of the lid-side main rotation axis 43. The other main arm end portion 41b extends continuously in the axial direction of the lid-side main rotation axis 43. The other main arm end portion 41b may be provided so as to extend intermittently in the axial direction of the lid-side main rotation axis 43. This intermittent structure may be specifically realized by arranging a plurality of portions, extending from a main body on the one main arm end portion 41a side to the other main arm end portion 41b side, such that these portions are aligned in the axial direction of the lid-side main rotation axis 43.

The other main arm end portion 41b is formed so as to extend longer in the axial direction than the one main arm end portion 41a. That is, the length (i.e., axial length) of the other main arm end portion 41b in the axial direction in which the lid-side main rotation axis 43 extends is longer than the length (i.e., axial length) of the one main arm end portion 41a in the axial direction in which the box-side main rotation axis 42 extends. The axial lengths of the other main arm end portion 41b and the one main arm end portion 41a may be the lengths between both axial ends of the other main arm end portion 41b and the one main arm end portion 41a.

The auxiliary arm 46 is placed so as to be aligned with the main arm 41 between the lid box 10 and the lid 20. The auxiliary arm 46 is placed so as to be partially adjacent to the main arm 41 in the axial direction. As the auxiliary arm 46, two arms may be provided with the main arm 41 interposed therebetween in the axial direction, or only one arm may be provided on one side in the axial direction with respect to the main arm 41. In addition, in the structure in which two auxiliary arms 46 are provided, the two auxiliary arms 46 may be coupled to each other in the axial direction, or may be independent of each other.

Figure 9:
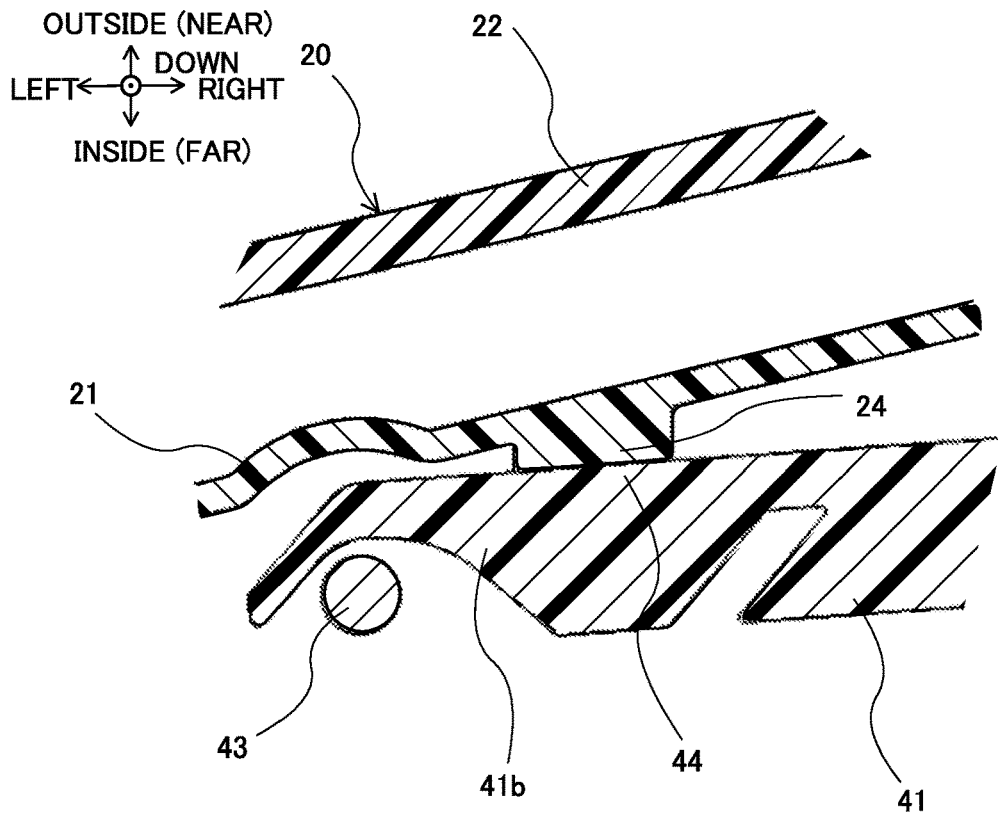
FIG. 9 is an enlarged view of a main part illustrating the positional relationship in FIG. 8.

As shown in FIG. 6, FIG. 7, and FIG. 9, the main arm 41 includes an arm-side restriction portion 44. The arm-side restriction portion 44 is a portion that comes into contact with the back surface side of the lid 20 (specifically, the inner member 21) at the opened position of the lid 20 to restrict the main arm 41 from rotating to the open side. The arm-side restriction portion 44 is provided to the other main arm end portion 41b. The arm-side restriction portion 44 extends in a direction parallel to the lid-side main rotation axis 43 on the other main arm end portion 41b side.

The arm-side restriction portion 44 extends continuously in the axial direction of the lid-side main rotation axis 43 between both axial ends of the other main arm end portion 41b. The arm-side restriction portion 44 is formed in a surface shape such that the arm-side restriction portion 44 is in surface contact with the back surface side of the lid 20 when coming into contact with the back surface side of the lid 20. That is, the arm-side restriction portion 44 is formed so as to have a surface that extends including the axial direction of the lid-side main rotation axis 43 and a direction orthogonal to the lid-side main rotation axis 43. The area of the arm-side restriction portion 44 is preferably, for example, 750 square millimeters or more in order to ensure sufficient rigidity when the arm-side restriction portion 44 and the back surface side of the lid 20 come into contact with each other.

The arm-side restriction portion 44 is formed so as to extend longer in the axial direction than the one main arm end portion 41a. That is, the length (i.e., axial length) of the arm-side restriction portion 44 in the axial direction in which the lid-side main rotation axis 43 extends is longer than the length (i.e., axial length) of the one main arm end portion 41a in the axial direction in which the box-side main rotation axis 42 extends. The axial length of the arm-side restriction portion 44 may be the length between both axial ends of the arm-side restriction portion 44.

Furthermore, the arm-side restriction portion 44 may extend continuously in the axial direction of the lid-side main rotation axis 43 as shown in FIG. 6, but may be provided so as to extend intermittently in the axial direction of the lid-side main rotation axis 43. That is, the arm-side restriction portion 44 may be configured so as to come into contact with the back surface side of the lid 20 with intervals in the axial direction of the lid-side main rotation axis 43 or in a state where a plurality of restriction pieces are aligned. In this structure, the ratio of the sum of the axial lengths by which the arm-side restriction portion 44 actually comes into surface contact with the back surface of the lid 20 to the length between both axial ends of the arm-side restriction portion 44 is, preferably, for example, 80% or more.

As shown in FIG. 9, the lid 20 includes a lid-side restriction portion 24. The lid-side restriction portion 24 is a portion that comes into contact with the arm-side restriction portion 44 of the main arm 41 at the opened position of the lid 20 to restrict the main arm 41 from rotating to the open side. The lid-side restriction portion 24 is provided on the back surface side of the lid 20 (specifically, the inner member 21). The lid-side restriction portion 24 extends in the direction parallel to the lid-side main rotation axis 43 on the back surface of the inner member 21. The arm-side restriction portion 44 and the lid-side restriction portion 24 are in surface contact with each other when coming into contact with each other. The lid-side restriction portion 24 may be formed so as to project from the back surface of the inner member 21 toward the lid contact side, as a receiving portion when coming into contact with the arm-side restriction portion 44.

As shown in FIG. 1 and FIG. 5, the lid box 10 includes a portion inclined with respect to the right-left direction Y in which the lid 20 is opened/closed with respect to the lid box 10. That is, the lid box 10 is formed in a shape in which the width thereof in the up-down direction Z changes in accordance with the position in the right-left direction Y. The width in the up-down direction Z is the width in a direction orthogonal to the right-left direction Y, and is the width between both axial ends of the lid box 10 in a direction parallel to the box-side main rotation axis 42 on the one main arm end portion 41a side. The position in the right-left direction Y is the position in a direction orthogonal to the direction parallel to the box-side main rotation axis 42.

As shown in FIG. 1, FIG. 4, and FIG. 5, the lid box 10 includes the narrow portion 18. The narrow portion 18 refers to a portion (left side in FIG. 1) that has a smaller width in the up-down direction Z than a general portion 19 of the lid box 10 and whose width in the up-down direction Z changes in accordance with the position in the right-left direction Y. The general portion 19 refers to a portion (right side in FIG. 1) whose width in the up-down direction Z is relatively large and whose width in the up-down direction Z does not change in accordance with the position in the right-left direction Y. The through hole 11a with respect to which the supply port 3 is placed on the near side is preferably provided on the general portion 19 side, not on the narrow portion 18 side, in order to ensure a sufficient size of the supply port 3.

The narrow portion 18 corresponds to the above portion inclined with respect to the right-left direction Y. The narrow portion 18 may be a portion in which each side of both end portions in the up-down direction Z of the lid box 10 is inclined, but may be a portion in which any one side thereof is inclined. For example, as shown in FIG. 1, the narrow portion 18 may be formed so as to be inclined such that the lower side thereof matches the inclination of the vehicle body surface 2 corresponding to a tire house. In this case, the lid box 10 is placed such that the narrow portion 18 is close to the inclination of the vehicle body surface 2 corresponding to the tire house.

As shown in FIG. 2 and FIG. 4, the lid 20 includes the narrow portion 25. The narrow portion 25 is provided correspondingly to the narrow portion 18 of the lid box 10. The narrow portion 25 refers to a portion whose width in the up-down direction Z is smaller than that of a general portion 26 of the lid 20 and whose width in the up-down direction Z changes in accordance with the position in the right-left direction Y. The general portion 26 refers to a portion whose width in the up-down direction Z does not change in accordance with the position in the right-left direction Y. The lid 20 is located such that, at the closed position thereof, the general portion 26 overlaps the general portion 19 and the narrow portion 25 overlaps the narrow portion 18.

The main arm 41 is rotatably supported on the lid box 10 at the narrow portion 18, and is rotatably supported on the lid 20 at the general portion 26. That is, the one main arm end portion 41a is placed at the narrow portion 18 of the lid box 10. The main arm 41 is supported in a state where the one main arm end portion 41a is located within the region of the narrow portion 18. The other main arm end portion 41b is placed at the general portion 26 of the lid 20. The main arm 41 is supported in a state where the other main arm end portion 41b is located within the region of the general portion 26.

Next, the operation of the lid opening/closing device 1 will be described.

In the lid opening/closing device 1, when no operation is performed at the closed position of the lid 20, the electric actuator 31 is not driven, and the operation member 32 is not manually operated, no power is generated by the electric actuator 31, and no power is generated by the operation member 32, so that the lid 20 is maintained at the closed position.

When the predetermined opening switch is turned on at the closed position of the lid 20, the electric actuator 31 generates an opening driving force for opening the lid 20. This opening driving force is transmitted to the main arm 41 of the link 40. When the opening driving force is transmitted to the main arm 41, the main arm 41 rotates in a forward direction, and the auxiliary arm 46 rotates in the forward direction in conjunction with the rotation of the main arm

41. When the main arm 41 and the auxiliary arm 46 rotate in the forward direction, the lid 20 is opened from the closed position toward the opened position while maintaining a state of being parallel to the vehicle body surface 2 and the opening 14. The opening motion of the lid 20 is continued until reaching the opened position at which the lid 20 is fully opened.

When the predetermined closing switch is turned on at the opened position of the lid 20, the electric actuator 31 generates a closing driving force for closing the lid 20. This closing driving force is transmitted to the main arm 41 of the link 40. When the closing driving force is transmitted to the main arm 41, the main arm 41 rotates in a reverse direction, and the auxiliary arm 46 rotates in the reverse direction in conjunction with the rotation of the main arm 41. When the main arm 41 and the auxiliary arm 46 rotate in the reverse direction, the lid 20 is closed from the opened position toward the closed position while maintaining a state of being parallel to the vehicle body surface 2 and the opening 14. The closing motion of the lid 20 is continued until reaching the closed position.

Furthermore, when the operation member 32 is manually operated by the operator, an external force caused by the manual operation is transmitted to the main arm 41 as power for opening the lid 20. When this power is transmitted to the main arm 41, the main arm 41 rotates in the forward direction, and the auxiliary arm 46 rotates in the forward direction in conjunction with the rotation of the main arm 41, whereby the lid 20 is opened from the closed position toward the opened position while maintaining a state of being parallel to the vehicle body surface 2 and the opening 14.

Therefore, in the lid opening/closing device 1, the power generated by the electric actuator 31 or the power generated by the operation member 32 is transmitted to the lid 20 via the link 40, thereby opening/closing the lid 20 between the closed position and the opened position.

In the lid opening/closing device 1, the main arm 41 of the link 40 includes the arm-side restriction portion 44 which comes into contact with the back surface side of the lid 20 at the opened position of the lid 20 to restrict the main arm 41 from rotating to the open side. In addition, the lid 20 includes the lid-side restriction portion 24 which comes into contact with the arm-side restriction portion 44 of the main arm 41 at the opened position of the lid 20 to restrict the main arm 41 from rotating to the open side. The arm-side restriction portion 44 of the main arm 41 is provided on the other main arm end portion 41b side on which the main arm 41 is rotatably supported on the lid 20. With this structure, at the opened position of the lid 20, the main arm 41 is restricted from rotating to the open side, thereby suppressing a change in the posture of the lid 20 with respect to the lid box 10.

The other main arm end portion 41b extends in the direction parallel to the lid-side main rotation axis 43, and the axial length of the other main arm end portion 41b is longer than the axial length of the one main arm end portion 41a. The axial length of the above arm-side restriction portion 44 is longer than the axial length of the one main arm end portion 41a of the main arm 41. With this structure, the region where the main arm 41 and the lid 20 come into contact with each other at the opened position of the lid 20 is widened as compared to a comparative structure in which the axial length of the arm-side restriction portion 44 is equal to or shorter than the axial length of the one main arm end portion 41a of the main arm 41.

When the region of contact between the main arm 41 and the lid 20 is widened as described above, the rigidity for positioning and fixing the lid 20 at the opened position is ensured, so that the posture of the lid 20 at the opened position is stabilized. Therefore, in the lid opening/closing device 1, the lid 20 is stably positioned and fixed relative to the lid box 10 at the opened position.

In the structure in which the main arm 41 comes into contact with the back surface side of the lid 20 over a wide region at the opened position of the lid 20 as described above, the contact positions of the main arm 41 and the lid 20 are set as the positions of the main arm 41 and the lid 20 when assembling the main arm 41 and the lid 20 to each other, whereby a reference position at the time of assembling is fixed. Therefore, assembling the main arm 41 and the lid 20 is facilitated, and the assemblability thereof is improved.

In the configuration in which the main arm 41 and the lid 20 come into contact with each other at the opened position of the lid 20 and the lid 20 is opened/closed by using the electric actuator 31 as described above, when the lid 20 comes into contact with the main arm 41 during opening of the lid 20 by the electric actuator 31, if control of stopping the operation of the electric actuator 31 is executed, the lid 20 is stopped at the opened position. Therefore, the lid 20 is reliably positioned and fixed at a desired opened position after the opening motion thereof by the electric actuator 31.

Furthermore, in the structure in which the main arm 41 and the lid 20 come into contact with each other at the opened position of the lid 20 as described above, the opened position of the lid 20 is adjusted by adjusting the rotation position of the main arm 41 and the timing when the arm-side restriction portion 44 of the main arm 41 and the lid-side restriction portion 24 of the lid 20 come into contact with each other. In this structure, the opened position at which the lid 20 is fully opened is adjusted without changing the structure of the lid box 10 and the structure of the one main arm end portion 41a of the main arm 41 connected to the lid box 10.

Therefore, with the configuration of the present embodiment, by applying the lid 20 and the main arm 41 of the link 40 having different structures to the same lid box 10, a lid opening/closing device 1 having a different opened position at which the lid 20 is fully-opened is configured. Thus, the components for forming lid opening/closing devices 1 that match vehicle models are shared.

In the lid opening/closing device 1, the lid box 10 includes the narrow portion 18 in which at least one side of both end portions in the up-down direction Z of the lid box 10 is inclined, and the lid 20 includes the narrow portion 25 corresponding to the narrow portion 18. The main arm 41 is in a state where the one main arm end portion 41a is placed at the narrow portion 18 of the lid box 10 and located within the region of the narrow portion 18, and is rotatably supported on the lid box 10 at the narrow portion 18. Also, the main arm 41 is in a state where the other main arm end portion 41b is placed at the general portion 26 of the lid 20 and located within the region of the general portion 26, and is rotatably supported on the lid 20 at the general portion 26.

That is, even when the installation position of the lid opening/closing device 1 is limited and the shapes of the lid box 10 and the lid 20 are each a shape in which a rectangular shape is cut out, specifically, the lid box 10 and the lid 20 are each formed in a shape in which at least one side of both end portions in the up-down direction Z thereof is inclined, the main arm 41 is formed so as to be longer in the axial direction on the other main arm end portion 41b side than on the one main arm end portion 41a side in the arm longitudinal direction, and is also placed such that the one main arm end portion 41a is connected to the narrow portion 18 side of the lid box 10 and the other main arm end portion 41b is connected to the general portion 26 side of the lid 20.

In this structure, the main arm 41 is connected to the narrow portion 18 of the lid box 10 at the one main arm end portion 41a and also connected to the lid 20 at the other main arm end portion 41b over most of the length between both ends in the axial direction thereof. Therefore, the portion between both ends in the axial direction at which the main arm 41 is connected to the lid 20 is avoided from being limited to a narrow range, so that the connection between the lid 20 and the link 40 is stabilized.

In particular, in the structure in which the lid box 10 is placed such that the narrow portion 18 is close to the inclination of the vehicle body surface 2 corresponding to the tire house, the portion between both ends in the axial direction at which the main arm 41 is connected to the lid 20 is avoided from being provided on one side in the axial direction, so that the connection between the lid 20 and the link 40 is further stabilized.

In the above embodiment, the lid-side main rotation axis 43 corresponds to "rotation axis on the other main arm end portion side" described in the claims, and the box-side main rotation axis 42 corresponds to "rotation axis on the one main arm end portion side" described in the claims.

The present invention is not limited to the above-described embodiment and modifications, and various changes may be made without departing from the gist of the present invention. In addition, the present specification discloses not only the technical concept indicated by the citation relationship between the claims as originally filed, but also the technical concept obtained by combining the matters recited in each claim as appropriate.

This application claims priority on Japanese Patent Application No. 2022-181455 filed in Japan on Nov. 11, 2022, the entire contents of which are incorporated herein by reference.

The invention claimed is:

1. A lid opening/closing device comprising:
   a lid box provided with an opening;
   a lid configured to be opened/closed between a closed position at which the lid closes the opening and an opened position at which the lid opens the opening; and
   an opening/closing mechanism configured to open/close the lid with respect to the lid box, wherein
   the opening/closing mechanism includes a link interposed between the lid box and the lid,
   the link includes
      a main arm rotatably supported on the lid box at one main arm end portion thereof, rotatably supported on the lid at another main arm end portion thereof, and configured to transmit an externally applied opening/closing driving force to the lid, and
      an auxiliary arm rotatably supported on the lid box at one auxiliary arm end portion thereof, rotatably supported on the lid at another auxiliary arm end portion thereof, and configured to restrict a posture of the lid during opening/closing of the lid so as to keep the lid in a predetermined posture, by rotating in conjunction with rotation of the main arm,
   the main arm includes an arm-side restriction portion provided to the other main arm end portion, extending in a direction parallel to a rotation axis on the other main arm end portion side, and configured to come into contact with a back surface side of the lid at the opened position of the lid to restrict the main arm from rotating to an open side,
   the lid includes a lid-side restriction portion provided on the back surface side thereof and configured to come into contact with the arm-side restriction portion at the opened position of the lid to restrict the main arm from rotating to the open side, and
   an axial length of the arm-side restriction portion is longer than an axial length of the one main arm end portion.

2. The lid opening/closing device according to claim 1, wherein the arm-side restriction portion and the lid-side restriction portion are in surface contact with each other when coming into contact with each other.

3. The lid opening/closing device according to claim 1, wherein
   the lid box is formed in a shape in which a width between both axial ends in a parallel direction parallel to a rotation axis on the one main arm end portion side changes in accordance with a position in a direction orthogonal to the parallel direction,
   the lid box includes a narrow portion in which the width is smaller than that of a general portion, and
   the main arm is rotatably supported on the lid box at the narrow portion.

4. The lid opening/closing device according to claim 1, wherein the opening/closing mechanism includes an electric actuator configured to generate the opening/closing driving force.

* * * * *